United States Patent
Utsumi

[19]
[11] Patent Number: 6,031,644
[45] Date of Patent: *Feb. 29, 2000

[54] METHOD, DEVICE, AND SYSTEM FOR CONTROLLING WAVELENGTH OF OPTICAL SIGNAL

[75] Inventor: Atsuhiko Utsumi, Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/851,707

[22] Filed: May 6, 1997

[30] Foreign Application Priority Data

Nov. 25, 1996 [JP] Japan .................................. 8-313487

[51] Int. Cl.⁷ .......................... H04B 10/08; H04B 10/04; H04J 14/02
[52] U.S. Cl. .......................... 359/110; 359/187; 359/124; 359/161; 372/34; 371/5-1
[58] Field of Search ...................................... 359/110, 124, 359/154, 135, 161, 187; 372/34, 32; 371/5.1

[56] References Cited

U.S. PATENT DOCUMENTS

| | | |
|---|---|---|
| 4,485,475 | 11/1984 | Large et al. ............................. 359/187 |
| 5,608,562 | 3/1997 | Delavaux et al. ....................... 359/161 |
| 5,623,355 | 4/1997 | Olsen ....................................... 359/110 |
| 5,696,859 | 12/1997 | Onaka et al. ............................ 359/187 |
| 5,777,773 | 7/1998 | Epworth et al. ......................... 359/187 |
| 5,896,201 | 4/1999 | Fukushima .............................. 356/394 |

FOREIGN PATENT DOCUMENTS

| | | |
|---|---|---|
| 58-182930 | 10/1983 | Japan . |
| 2-219332 | 8/1990 | Japan . |
| 7-30520 | 1/1995 | Japan . |

*Primary Examiner*—Kinfe-Michael Negash
*Attorney, Agent, or Firm*—Staas & Halsey LLP

[57] ABSTRACT

A method, device, and system for controlling the wavelength of an optical signal. For example, the system includes an E/O converter for converting an input electrical signal into an optical signal, an optical band-pass filter to which the optical signal is supplied, an O/E converter for converting the optical signal passed through the filter into an output electrical signal, a detecting unit for detecting a bit error of the output electrical signal, and a control unit for controlling a parameter (e.g., temperature of a laser diode) on which the wavelength of the optical signal depends so that the bit error detected decreases. In this system, the wavelength of the optical signal is maintained constant, so that a degradation in transmission quality due to wavelength changes is prevented.

21 Claims, 12 Drawing Sheets

METHOD, DEVICE, AND SYSTEM FOR CONTROLLING WAVELENGTH OF OPTICAL SIGNAL

BACKGROUND OF THE INVENTION

1. Field of the Invention

The present invention relates generally to prevention of a degradation in transmission quality due to wavelength changes of an optical signal, and more particularly to a method, device, and system for controlling the wavelength of an optical signal.

2. Description of the Related Art

Widely known is an optical fiber communication system including an E/O converter for converting an input electrical signal into an optical signal, an optical fiber transmission line for transmitting the optical signal, and an O/E converter for converting the optical signal transmitted by the optical fiber transmission line into an output electrical signal. An optical amplifier is applied, so as to compensate for attenuation of the optical signal in the optical fiber transmission line.

In recent years, an erbium doped fiber amplifier (EDFA) operating in a wavelength band of 1.55 μm which gives the smallest loss in a silica optical fiber has been put into practical use. In an optical fiber communication system to which an EDFA is applied, an amplified spontaneous emission (ASE) generated in the EDFA becomes a noise, so that an optical band-pass filter is generally used to remove the ASE.

A laser diode is frequently used as the E/O converter in the optical fiber communication system as mentioned above. The wavelength of an optical signal output from the laser diode changes because of a temperature change or aged deterioration of the laser diode. The pass band of an optical band-pass filter is set so that a desired optical signal passes the filter with a small loss (i.e., large transmittance). Accordingly, if the wavelength of an optical signal changes, the optical signal is attenuated or removed in the filter, causing a degradation in transmission quality or, in the worst case a reception incapability. Particularly in a system to which wavelength-division multiplexing (WDM) is applied, an optical band-pass filter in each wavelength channel has a narrow pass band, so that it is desirable to control the wavelength of an optical signal in each channel with a high accuracy.

SUMMARY OF THE INVENTION

It is therefore an object of the present invention to prevent a degradation in transmission quality due to wavelength changes of an optical signal. Specifically, it is an object of the present invention to provide a method, device, and system for controlling the wavelength of an optical signal.

Other objects of the present invention will become apparent from the following description.

In accordance with an aspect of the present invention, there is provided a method for controlling the wavelength of an optical signal. First, an input electrical signal is converted into an optical signal. The optical signal is next supplied to an optical band-pass filter. The optical signal passed through the optical band-pass filter is converted into an output electrical signal. Thereafter, a bit error of the output electrical signal is detected. Then, the wavelength of the optical signal is controlled so that the bit error detected decreases.

For example, in the case that the optical band-pass filter has a pass band including a center wavelength substantially providing a maximum transmittance, the bit error of the output electrical signal increases if the wavelength of the optical signal differs from the center wavelength of the filter. Accordingly, by controlling the wavelength of the optical signal so that the bit error detected decreases as in the method of the present invention, the wavelength of the optical signal always coincides with the center wavelength of the filter, thereby maintaining a good transmission quality.

In accordance with another aspect of the present invention, there is provided a system for controlling the wavelength of an optical signal. This system comprises an E/O converter for converting an input electrical signal into an optical signal; an optical band-pass filter to which the optical signal is supplied; an O/E converter to which the optical signal passed through the optical band-pass filter is supplied, for converting the optical signal into an output electrical signal; means to which the output electrical signal is supplied, for detecting a bit error of the output electrical signal; and means for controlling a parameter on which the wavelength of the optical signal output from the E/O converter depends so that the bit error detected decreases.

In accordance with a further aspect of the present invention, there is provided a terminal device for controlling the wavelength of an optical signal. This device comprises an optical sender including an E/O converter for converting an input signal into a first optical signal; means for dividing the first optical signal into a first beam to be sent to a first optical transmission line and a second beam for monitoring; first and second optical receivers; and an optical circuit for selectively supplying a second optical signal from a second optical transmission line and the second beam to the first and second optical receivers, respectively. Each of the first and second optical receivers comprises an optical band-pass filter to which the second beam is supplied; an O/E converter to which the second beam passed through the optical band-pass filter is supplied, for converting the second beam into an output electrical signal; and means to which the output electrical signal is supplied, for detecting a bit error of the output electrical signal. A parameter on which a wavelength of the first optical signal output from the E/O converter depends is controlled so that the bit error detected decreases.

In the case that the terminal device has such two optical receivers, one of the two optical receivers is used as a service optical receiver, and the other is used as a backup optical receiver, whereby the bit error can be detected in the backup optical receiver. Accordingly, the method of the present invention can be completely performed by the single terminal device.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Some preferred embodiments of the present invention will now be described in detail with reference to the attached drawings. Throughout the drawings, substantially the same parts are denoted by the same reference numerals.

Figure 1:
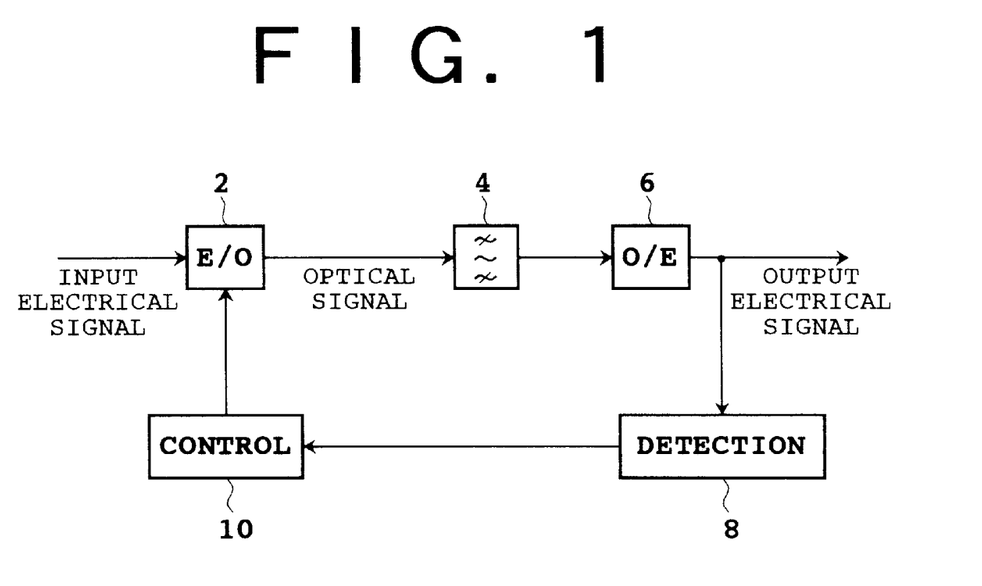
FIG. 1 is a block diagram showing a basic configuration of a system according to the present invention.

FIG. 1 is a block diagram showing a basic configuration of a system according to the present invention. An E/O (electro/optical) converter 2 converts an input electrical signal into an optical signal. The optical signal from the E/O converter 2 is supplied to an optical band-pass filter 4. An optical signal passed through the filter 4 is input into an O/E (opto/electrical) converter 6. The O/E converter 6 converts the input optical signal into an output electrical signal. A detecting unit 8 is provided to detect a bit error of the output electrical signal. A control unit 10 controls a parameter on which the wavelength of the optical signal output from the E/O converter 2 depends so that the bit error detected in the detecting unit 8 decreases.

Figure 2A:
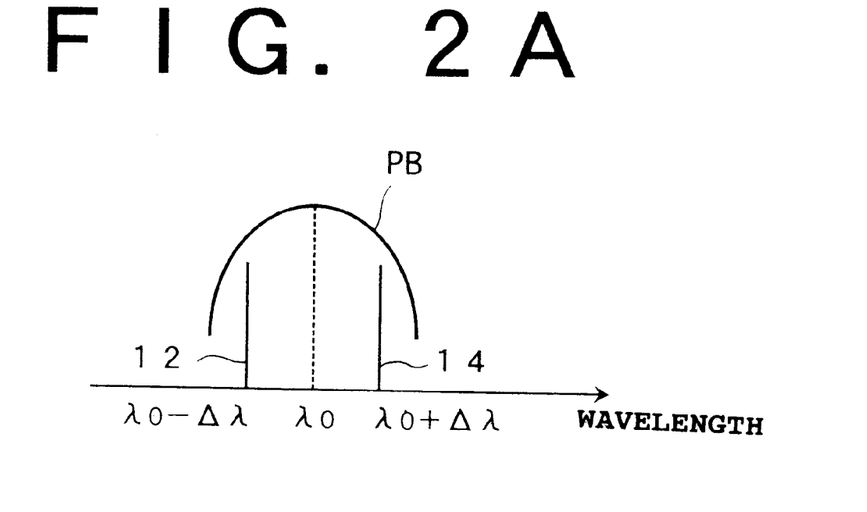
FIGS. 2A and 2B are illustrations of the principle of operation of the system shown in FIG. 1.
Figure 2B:
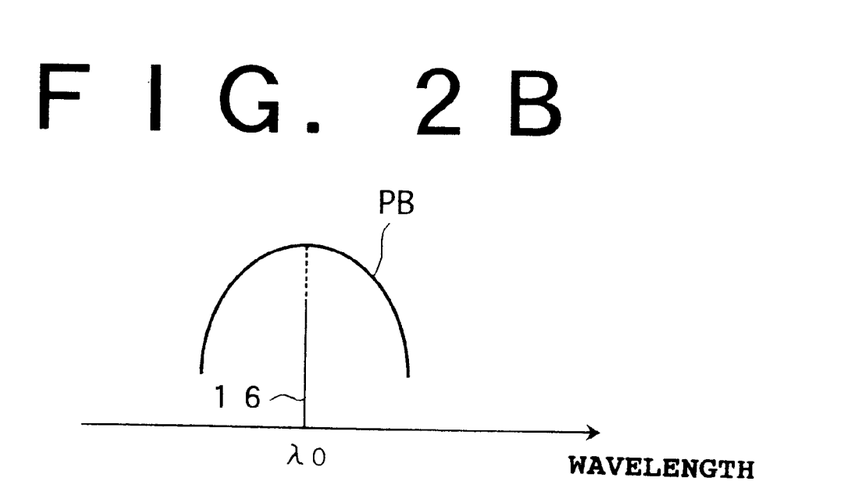

The principle of operation of the system shown in FIG. 1 will now be described with reference to FIGS. 2A and 2B. As shown in FIG. 2A, the optical band-pass filter 4 has a pass band PB including a center wavelength $\lambda_0$ substantially giving a maximum transmittance. A characteristic curve representing the pass band PB shows the relation between transmittance of the filter 4 and wavelength. When the wavelength of the optical signal output from the E/O converter 2 becomes shorter than the center wavelength $\lambda_0$ by $\Delta\lambda$ as shown by reference numeral 12, the bit error increases as compared with the case that the wavelength of the optical signal coincides with the center wavelength $\lambda_0$. Further, also when the wavelength of the optical signal becomes longer than the center wavelength $\lambda_0$ by $\Delta\lambda$, the bit error increases. The reason for such an increase in the bit error when the wavelength of the optical signal is shifted from the center wavelength $\lambda_0$ is that the power of the optical signal passing through the filter 4 decreases. The detecting unit 8 detects such a change in the bit error or detects the bit error itself, and the control unit 10 controls the wavelength of the optical signal so that the detected bit error decreases. As a result, the wavelength of the optical signal comes to coincidence with a wavelength $\lambda_0$ giving the maximum transmittance of the filter 4 (i.e., the minimum bit error of the output electrical signal) as shown by a reference numeral 16 in FIG. 2B.

According to the system shown in FIG. 1, a degradation in transmission quality due to wavelength changes of the optical signal is prevented. By controlling, for example, the temperature of the optical band-pass filter 4 so that the characteristics of the filter 4 are maintained constant, the wavelength of the optical signal output from the E/O converter 2 can be absolutely stabilized. That is, the filter 4 serves as a wavelength reference.

Figure 3:
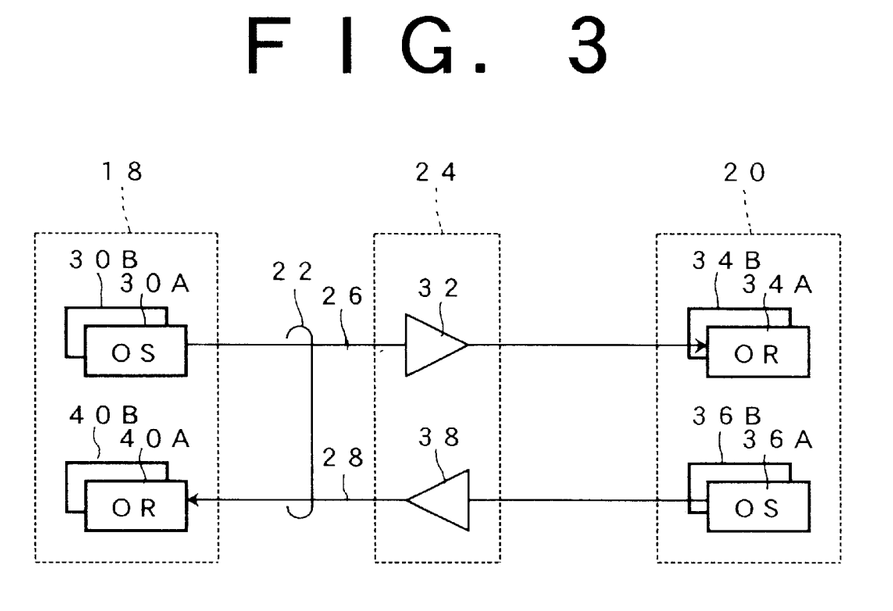
FIG. 3 is a block diagram of an optical communication system to which the present invention is applicable.

FIG. 3 is a block diagram of an optical communication system to which the present invention is applicable. This system includes a first terminal 18, a second terminal 20, and an optical fiber transmission line 22 for connecting the terminals 18 and 20. An optical repeater 24 is provided on the way of the optical fiber transmission line 22, so as to compensate for loss in the optical fiber transmission line 22.

The optical fiber transmission line 22 includes an up line 26 directed from the first terminal 18 to the second terminal 20, and a down line 28 directed from the second terminal 20 to the first terminal 18. The first terminal 18 has two optical senders (OSs) 30A and 30B for ensuring redundancy to send out an up optical signal to the up line 26. The optical repeater 24 has an optical amplifier 32 connected to the up line 26, for amplifying the up optical signal. The second terminal 20 has two optical receivers (ORs) 34A and 34B for ensuring redundancy to receive the up optical signal. The second terminal 20 further has two optical senders 36A and 36B for ensuring redundancy to send out a down optical signal to the down line 28. The optical repeater 24 has an optical amplifier 38 connected to the down line 28, for amplifying the down optical signal. The first terminal 18 has two optical receivers 40A and 40B for ensuring redundancy to receive the down optical signal.

In the condition shown in FIG. 3, the optical senders 30A and 36A and the optical receivers 34A and 40A are for service use, and the optical senders 30B and 36B and the optical receivers 34B and 40B are for backup use.

The system according to the present invention as shown in FIG. 1 may be constructed closedly in the first terminal 18 or the second terminal 20 shown in FIG. 3, or may be constructed openly so as to extend over the terminals 18 and 20. In the case that the system according to the present invention is closely constructed in the first terminal 18, the E/O converter 2 is included in the service optical sender 30A, and the optical band-pass filter 4, the O/E converter 6, and the detecting unit 8 are included in the backup optical receiver 40B. In this case, a part of the optical signal output from the optical sender 30A is supplied to the optical receiver 40B. In the case that the system according to the present invention is openly constructed, the E/O converter 2 is included in the service optical sender 30A in the first terminal 18, and the O/E converter 6 and the detecting unit 8 are included in the service optical receiver 34A in the second terminal 20. In this case, the optical band-pass filter 4 is included in the optical repeater 24 or the optical receiver 34A.

Figure 4:
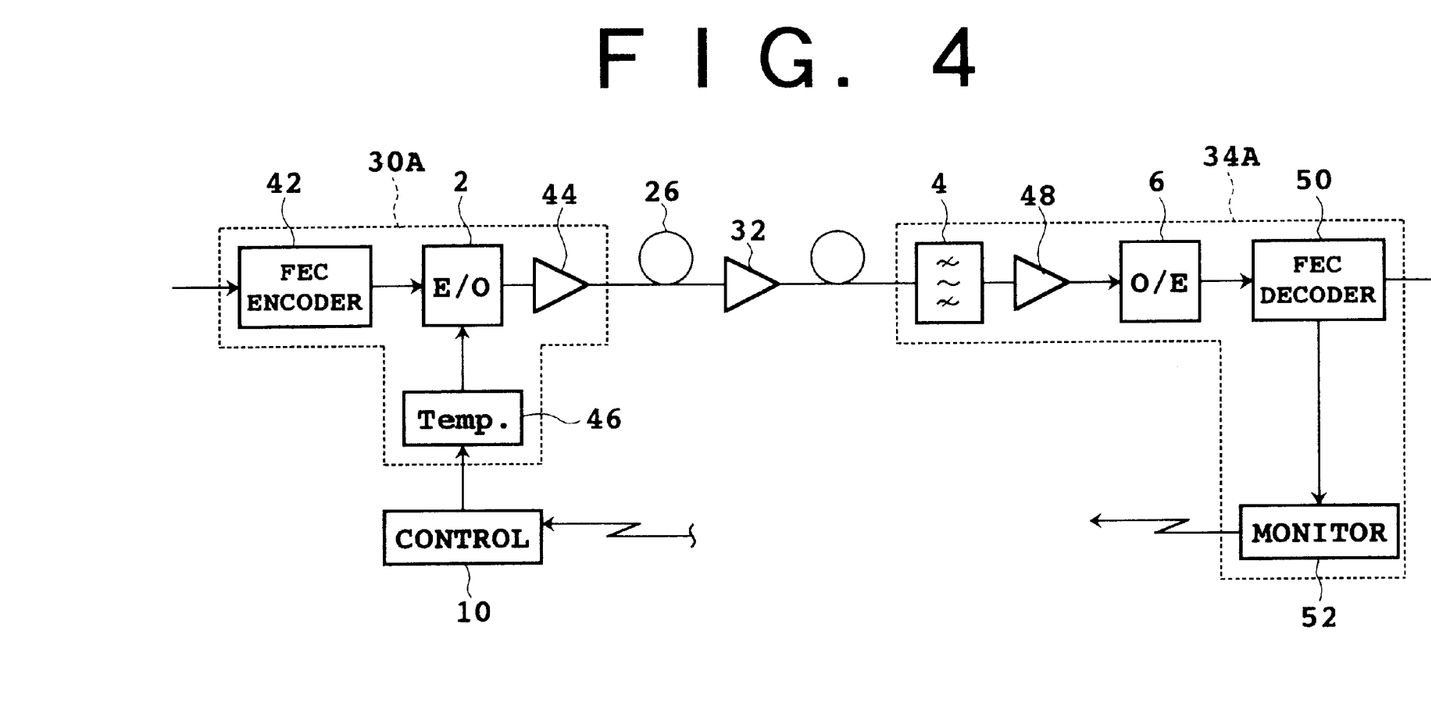
FIG. 4 is a block diagram of a system showing a first preferred embodiment of the present invention.

Referring to FIG. 4, there is shown a first preferred embodiment of the present invention. In this preferred embodiment, the optical sender 30A, the up line (optical fiber transmission line) 26, the optical amplifier 32, and the optical receiver 34A are used to construct an open system according to the present invention.

The optical sender 30A includes the E/O converter 2 shown in FIG. 1. The E/O converter 2 includes a laser diode supplied with a DC or controlled bias current and a modulation pulse superimposed on the bias current. The oscillation wavelength of the laser diode (the wavelength of an optical signal to be output) is dependent on parameters such as a bias current and a temperature. In this preferred embodiment, the temperature of the laser diode is used as a parameter, and it is controlled by a temperature control circuit 46. The oscillation wavelength of a general laser diode becomes longer with a rise in temperature. The optical sender 30A further has an FEC (Forward Error Correction) encoder 42 for adding a redundancy code to a transmission data code of an input electrical signal to be supplied to the E/O converter 2, and an optical amplifier 44 for amplifying the optical signal output from the E/O converter 2.

The optical receiver 34A has the optical band-pass filter 4 and the O/E converter 6 shown in FIG. 1. An optical amplifier 48 is provided between the filter 4 and the converter 6. The order of the filter 4 and the amplifier 48 may be reversed. An FEC decoder 50 is provided to correct a bit error of an output electrical signal from the O/E converter 6. An input electrical signal to the FEC encoder 42 and an output electrical signal from the FEC decoder 50 are adapted to a synchronous digital hierarchy (SDH) in this preferred embodiment.

The SDH defines an interface for effectively multiplexing various high-speed services or an existing low-speed service, and is standardized by CCITT (presently, ITU-T) in November, 1988. The multiplexing is characterized by a basic rate of 155.52 Mb/s (which will be called STM-1 level) with the proviso that the frequency of a network is synchronized, and by the use of a transmission rate equal to the integral multiple of the basic rate, i.e., N×155.52 Mb/s. At present, N=1, 4, and 16, i.e., 155.52 Mb/s (STM-1), 622.08 Mb/s (STM-4), 2.48832 Gb/s (STM-16) are defined. In the case that STM-16 is applied, a chip of L64710 made by LSI Logic Inc. may be used as the FEC encoder 42 and/or the FEC decoder 50.

The FEC decoder 50 outputs transmission data with a bit error corrected, and outputs data reflecting the number of corrections of the bit error. Accordingly, in this preferred embodiment, the degree of the bit error can be easily detected by counting the corrections of the bit error in the FEC decoder 50. The number of the corrections is monitored in a monitor circuit 52, and the result of monitoring is sent from the optical receiver 34A to the control unit 10. The transmission of the monitoring result may be effected by using the optical sender 36A, the down line 28, and the optical receiver 40A shown in FIG. 3, for example.

An EDFA may be used as each of the optical amplifiers 32, 44, and 48. The EDFA includes an erbium doped fiber (EDF), a pump light source for outputting pump light, and an optical circuit for supplying an optical signal to be amplified and the pump light to the EDF. In the case that the wavelength of the optical signal falls in a band of 1.55 $\mu$m, the wavelength of the pump light falls in a band of 0.98 $\mu$m or 1.48 $\mu$m, for example.

Figure 5A:
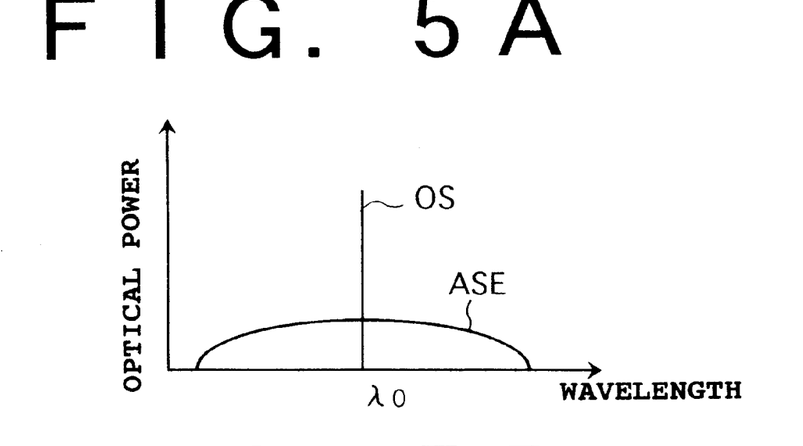
FIGS. 5A, 5B, and 5C are illustrations of spectra at different parts in the system shown in FIG. 4.
Figure 5B:
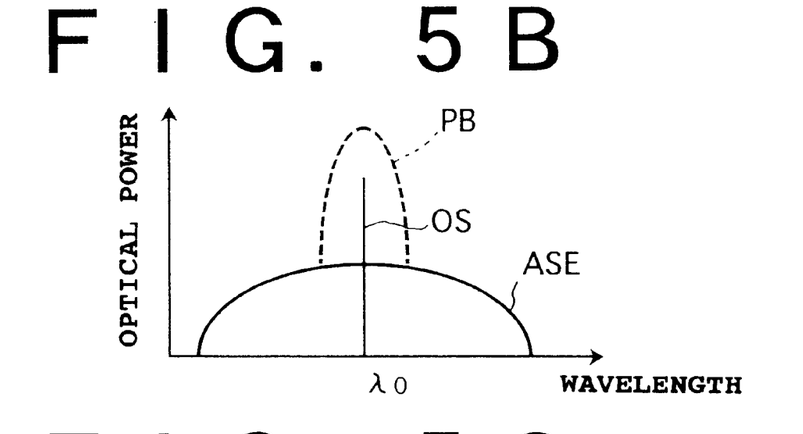
Figure 5C:
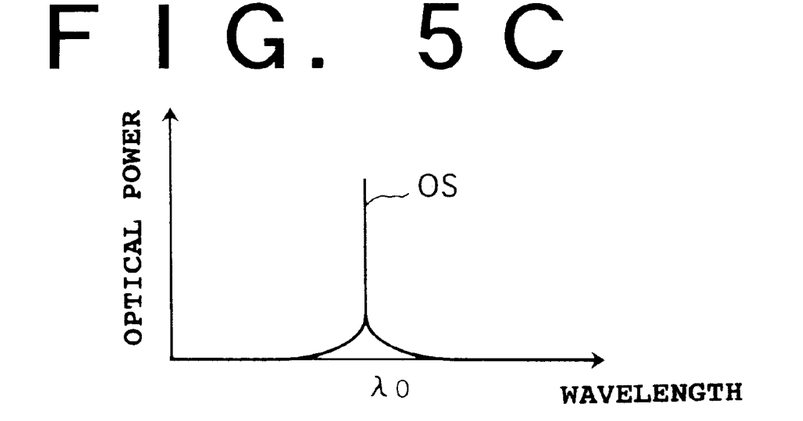

Referring to FIGS. 5A, 5B, and 5C, there are shown spectra in different portions of the system shown in FIG. 4. FIG. 5A shows a spectrum at the output port of the optical sender 30A. Since the optical sender 30A has the optical amplifier 44, the spectrum OS of the optical signal is superimposed on an ASE spectrum ASE. FIG. 5B shows a spectrum at the input port of the optical band-pass filter 4. Since the optical signal is further amplified by the optical amplifier 32, the ASE spectrum ASE is larger than that shown in FIG. 5A. Since the optical band-pass filter 4 has a pass band shown by reference symbol PB, a large part of the ASE is removed by the filter 4, and a spectrum at the input port of the optical amplifier 48 substantially becomes the spectrum OS of the optical signal as shown in FIG. 5C.

While the optical band-pass filter 4 is so provided as to be associated with the optical amplifier 48 in the optical receiver 34A in this preferred embodiment, the filter 4 may be so provided as to be associated with the optical amplifier 32 or 44. Owing to the use of the optical band-pass filter 4, a noise due to ASE is reduced to thereby improve S/N.

Further, since bit error correction is carried out by using the FEC encoder 42 and the FEC decoder 50, a bit error rate (BER) can be improved. In the case that error correction using a Reed-Solomon code is carried out, for example, the BER of an original signal of $10^{-3}$, $10^{-4}$, and $10^{-5}$ can be improved to $10^{-5}$, $10^{-13}$, and $10^{-21}$, respectively, after correction.

Further, the control unit 10 controls the wavelength of the optical signal output from the E/O converter 2 so that a count value of corrections in the FEC decoder 50 decreases according to the count value. Accordingly, the wavelength of the optical signal always coincides with the center wavelength $\lambda_0$ of the optical band-pass filter 4.

Figure 6:
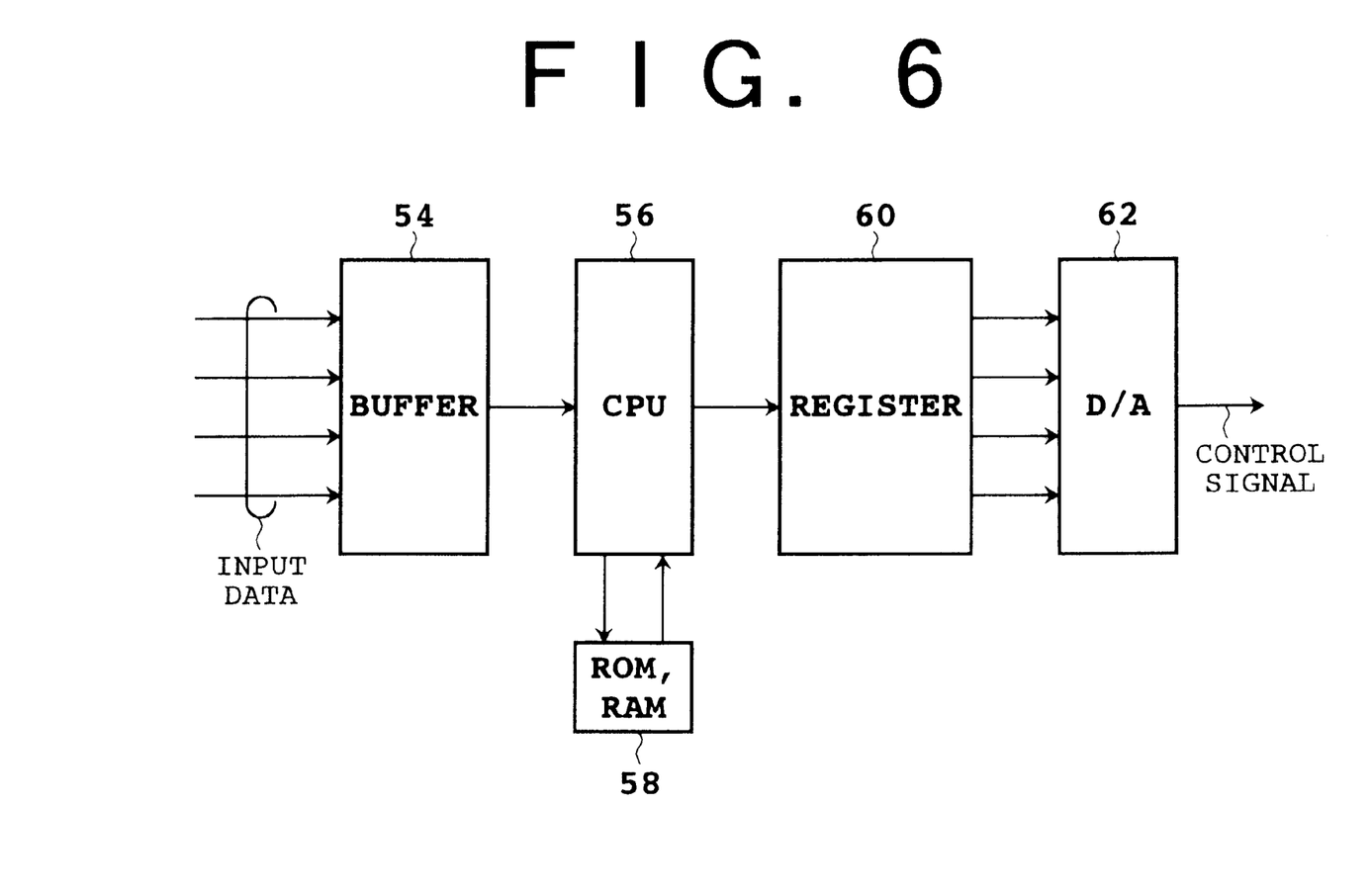
FIG. 6 is a block diagram of a control unit applicable to the present invention.

A specific configuration and operation of the control unit 10 will now be described. FIG. 6 is a block diagram of a control unit applicable to the present invention. This control unit is supplied with a plurality of bits of input data representing a correction count value of bit error in the FEC decoder 50 (see FIG. 4) (which will be hereinafter referred to simply as "error count"), and outputs a control signal for controlling the temperature of the laser diode in the E/O converter 2 so that the error count is converged to a minimum value.

The input data is supplied through a buffer 54 to a CPU (central processing unit) 56. A memory unit 58 is connected to the CPU 56. The memory unit 58 includes a ROM (read-only memory) storing a program and data for executing the program, and a RAM (random access memory) for temporarily storing a result of computation. The result of computation in the CPU 56 is supplied through a register 60 to a D/A (digital/analog) converter 62. A control signal output from the D/A converter 62 is supplied to the temperature control circuit 46 shown in FIG. 4. In the case that the temperature control circuit 46 performs digital signal processing, the D/A converter 62 may be omitted to connect the register 60 directly to the temperature control circuit 46.

Figure 7:
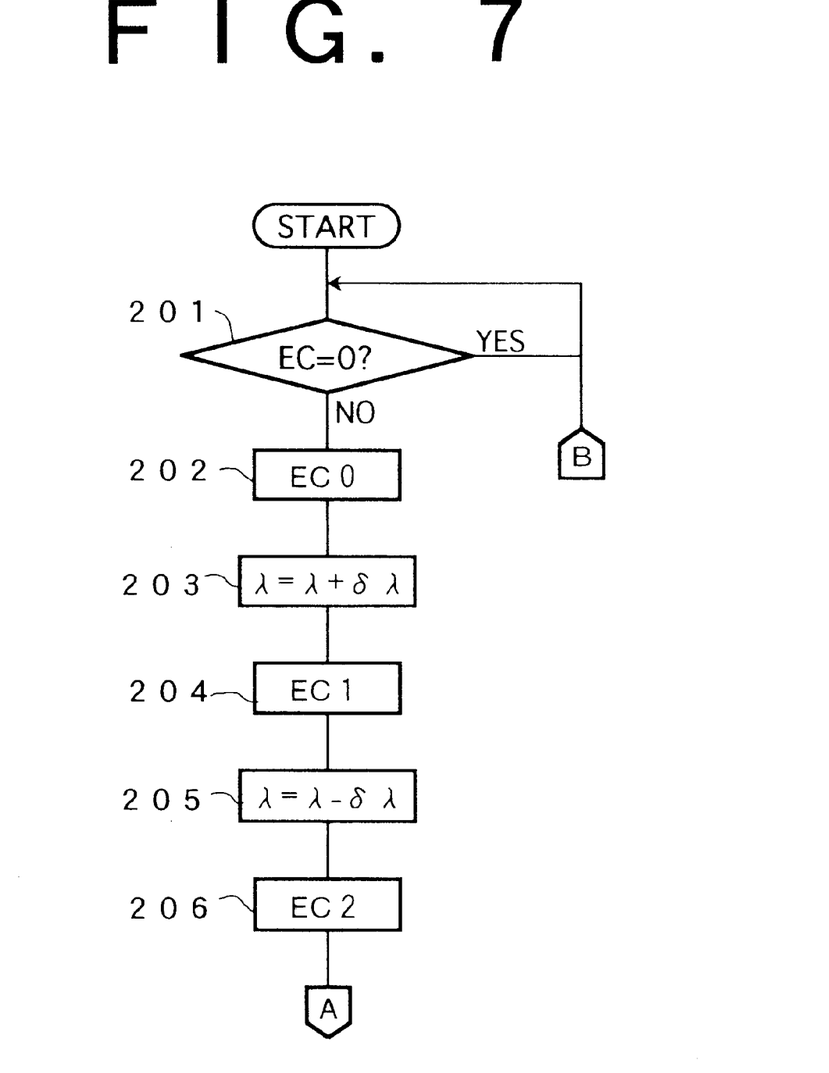
FIGS. 7 and 8 are flowcharts showing the operation of the control unit.
Figure 8:
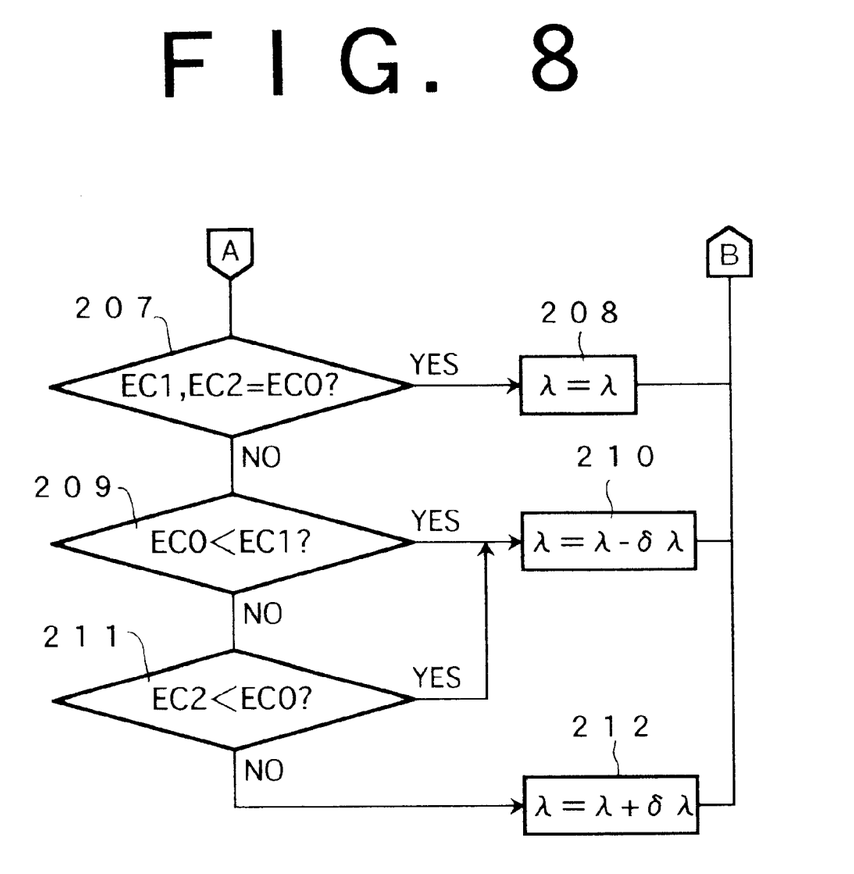

Referring to FIGS. 7 and 8, there is shown a flowchart showing the operation of the control unit. In step 201, it is determined whether or not an error count EC is 0. If the error count EC is 0, wavelength control (temperature control) is not performed, but the program enters a waiting state. If the error count EC is not 0, the program proceeds to step 202, in which an error count EC0 at an initial wavelength is detected. In step 203, the wavelength is changed to a value longer than the initial wavelength by a fine step $\delta\lambda$. An error count EC1 at this time is detected in step 204. In step 205, the wavelength is changed to a value shorter than the initial wavelength by the fine step $\delta\lambda$. An error count EC2 at this time is detected in step 206.

In step 207, it is determined whether or not both the error counts ECd and EC2 are equal to the error count EC0. If both the error counts EC1 and EC2 are equal to EC0, the program proceeds to step 208, in which the wavelength is set to the initial wavelength, and the program returns to step 201. If at least one of EC1 and EC2 is not equal to EC0 in step 207, the program proceeds to step 209. In step 209, it is determined whether or not EC1 is larger than EC0. If EC1 is larger than EC0, the program proceeds to step 210, in which the wavelength is set to a value shorter by $\delta\lambda$ than the initial wavelength, and the program returns to step 201. If EC1 is equal to or small than EC0 in step 209, the program proceeds to step 211. In step 211, it is determined whether or not EC2 is smaller than EC0. If EC2 is smaller than EC0, the program proceeds to step 210. If EC2 is equal to or larger than EC0, the program proceeds to step 212. In step 212, the wavelength is set to a value longer by $\delta\lambda$ than the initial wavelength, and the program returns to step 201.

According to the operation by this flowchart, the wavelength of the optical signal can be stabilized at a target (the center wavelength $\lambda_0$ of the optical band-pass filter 4) with the accuracy of the fine step $\delta\lambda$. The fine step $\delta\lambda$ may be set to a range of 0.1 nm to 10 nm, for example. To improve the control accuracy, the value of the fine step $\delta\lambda$ may be changed to carry out the above-mentioned flowchart plural times.

In this preferred embodiment, in the case that there is no change in error count when changing the wavelength by the fine step with respect to the initial wavelength, the initial wavelength is maintained as it is. This may be considered to be due to the fact that the error count is generated by any causes other than the wavelength changes of the optical signal.

Figure 9:
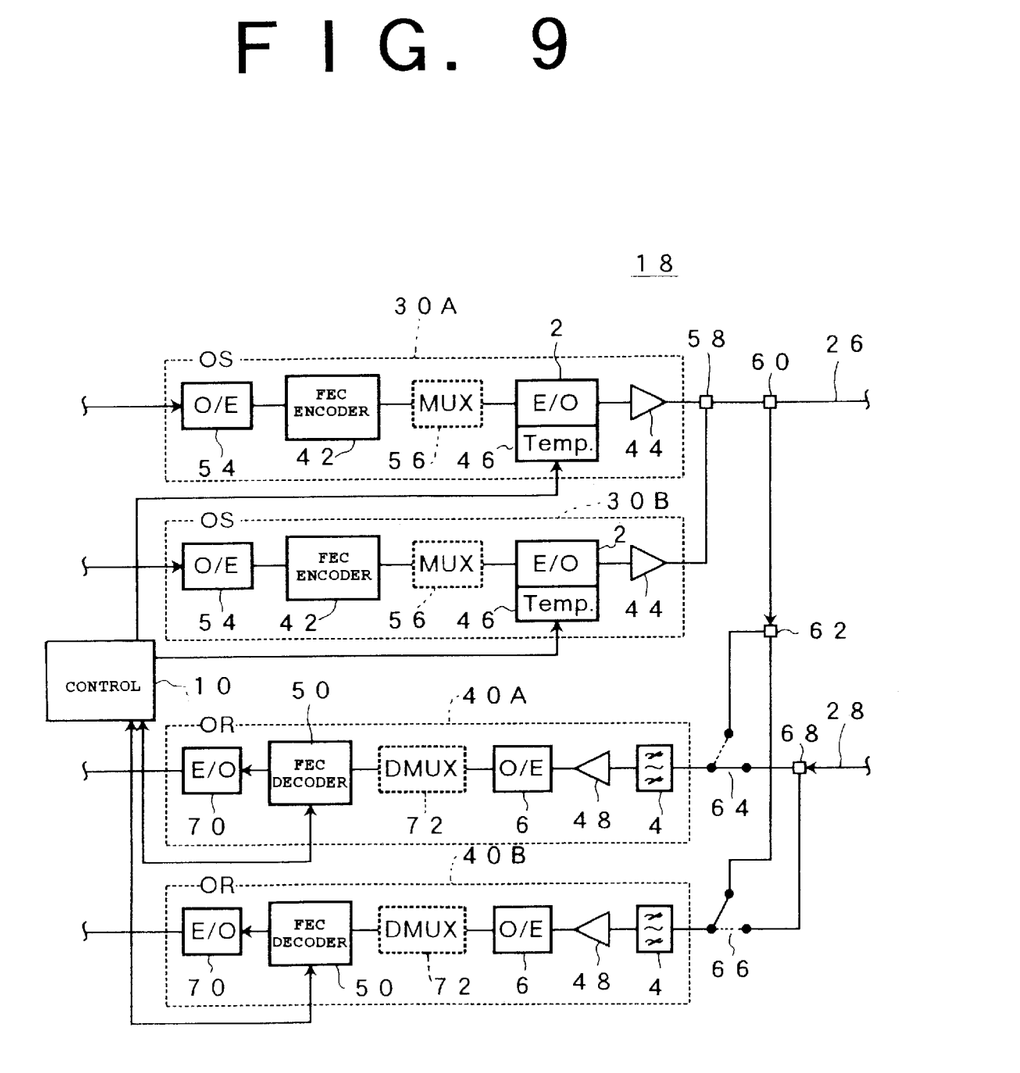
FIG. 9 is a block diagram of a system showing a second preferred embodiment of the present invention.

Referring to FIG. 9, there is shown a second preferred embodiment of the present invention. In FIG. 9, there is shown a specific configuration of a terminal device in the case that the present invention is applied to the first terminal 18 shown in FIG. 3.

Each of the optical senders 30A and 30B has the FEC encoder 42, the E/O converter 2, the temperature control circuit 46, and the optical amplifier 44, and further has an O/E converter 54 to be connected to a low-speed optical fiber network. An optical signal from the low-speed optical fiber network is converted into an input electrical signal by the O/E converter 54, and this input electrical signal is supplied to the FEC encoder 42.

In the case of performing time-division multiplexing for a plurality of low-speed optical fiber networks, a plurality of O/E converters 54 and FEC encoders 42 corresponding to a plurality of channels may be provided in each of the optical senders 30A and 30B, and a multiplexer (MUX) as shown by reference numeral 56 may be provided between the E/O converter 2 and the plural FEC encoders 42.

An optical coupler 58 is provided to introduce an optical signal output from each of the optical senders 30A and 30B into the up line 26. An optical signal output from the optical coupler 58 is branched by an optical coupler 60 into a first beam to be sent to the up line 26 and a second beam for monitoring. To selectively supply the monitoring second beam from the optical coupler 60 and an optical signal from the down line 28 to the optical receivers 40A and 40B, there is provided an optical circuit including an optical coupler 62, optical switches 64 and 66, and an optical coupler 68. In the condition shown, the optical signal from the down line 28 is supplied through the optical coupler 68 and the optical switch 64 to the optical receiver 40A, and the monitoring second beam from the optical coupler 60 is supplied through the optical coupler 62 and the optical switch 66 to the optical receiver 40B. When the optical switches 64 and 66 are operated, the monitoring second beam is supplied to the optical receiver 40A, and the optical signal from the down line 28 is supplied to the optical receiver 40B.

Each of the optical receivers 40A and 40B has the optical band-pass filter 4, the optical amplifier 48, the O/E converter 6, and the FEC decoder 50, and further has an E/O converter 70 to be connected to a low-speed optical fiber network. An electrical signal output from the FEC decoder 50 is converted into an optical signal by the E/O converter 70, and this optical signal is supplied to the low-speed optical fiber network. In the case that an optical signal output from the O/E converter 6 in each of the optical receivers 40A and 40B is time-division multiplexed, a demultiplexer (DMUX) 72 is provided on the output side of the O/E converter 6, and a plurality of couples of FEC decoder 50 and E/O converter 70 corresponding to multiple channels are provided in parallel on the downstream side of the demultiplexer 72.

The optical senders 30A and 30B are selectively used. That is, in the case that an optical signal from the service optical sender 30A is supplied to the up line 26, the backup optical sender 30B is not operated. For example, when the service optical sender 30A cannot operate because of the trouble of the E/O converter 2, the backup optical sender 30B is driven and an optical signal from the optical sender 30B is supplied to the up line 26. Thus, system-down due to the trouble of the optical sender is prevented.

In the condition shown in FIG. 9, the service optical receiver 40A receives an optical signal from the down line 28, so that the backup optical receiver 40B is used for the control by the present invention. That is, a part of the optical signal from any one of the optical senders 30A and 30B is supplied to the optical receiver 40B, and an error count from the FEC decoder 50 in the optical receiver 40B is supplied to the control unit 10. A control signal is supplied from the control unit 10 to the temperature control circuit 46 in one of the optical senders 30A and 30B during operation. By such an operation, the wavelength of an optical signal is controlled in accordance with the principle of the present invention to thereby prevent a degradation in transmission quality due to wavelength changes.

Depending on the operation of a host computer (not shown) for controlling the operations of the optical senders 30A and 30B and the optical receivers 40A and 40B, there is a case that the optical receivers 40A and 40B are switched in response to switching of the optical senders 30A and 30B. For example, when the optical sender 30B is driven in response to the trouble of the optical sender 30A, the optical switches 64 and 66 are switched in response thereto. As a result, an optical signal from the down line 28 is supplied to the backup optical receiver 40B, and a part of the optical signal from the optical sender 30B is supplied to the optical receiver 40A. In this condition, an error count from the FEC decoder 50 in the optical receiver 40A is supplied to the control unit 10, and a control signal is supplied from the control unit 10 to the temperature control circuit 46 in the optical sender 30B.

To ensure the redundancy of the system on the up line 26, the two optical senders 30A and 30B are provided in this preferred embodiment. However, to perform the wavelength control by the present invention, a single optical sender may be provided in the terminal device. While the terminal device according to the present invention has been described on the first terminal 18 shown in FIG. 3, the present invention may be applied to the second terminal 20, of course.

Figure 10:
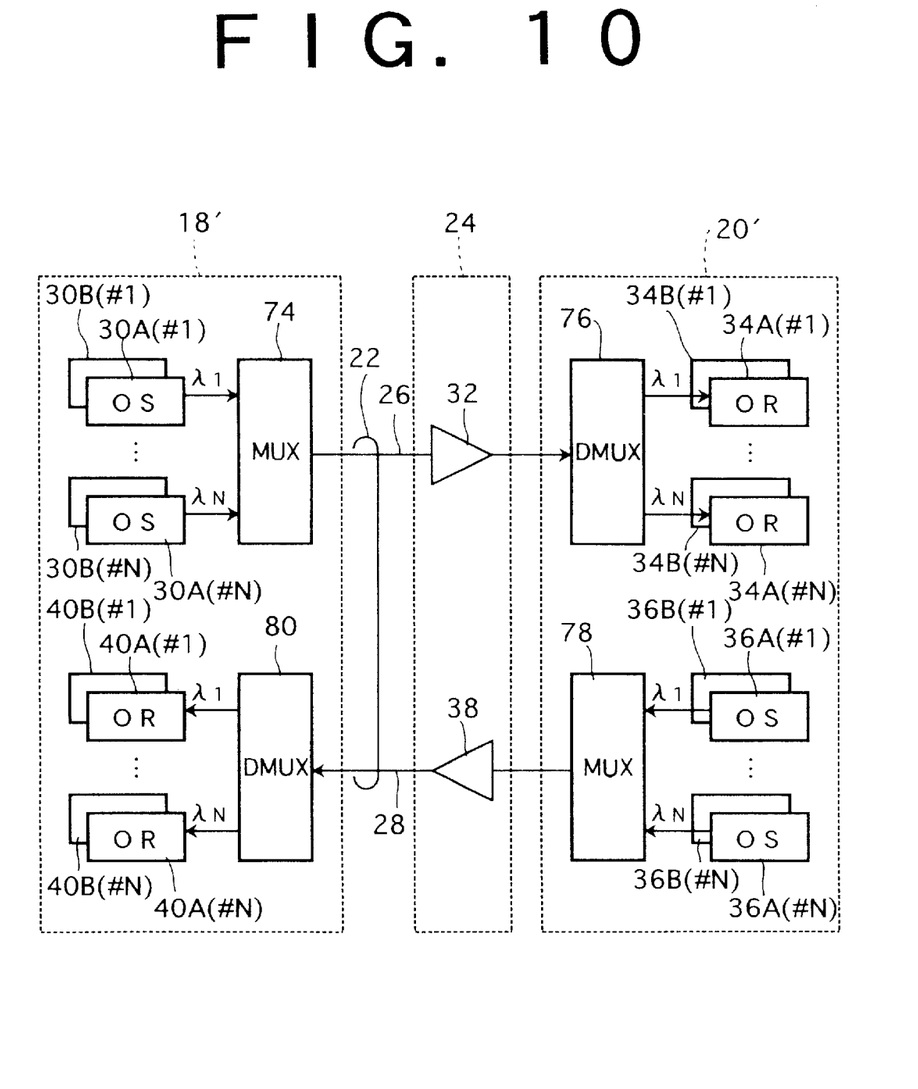
FIG. 10 is a block diagram of another optical communication system to which the present invention is applicable.

Referring to FIG. 10, there is shown another optical communication system to which the present invention is applicable. In contrast with the system shown in FIG. 3, the system shown in FIG. 10 employs a first terminal 18' and a second terminal 20' each modified so as to be adapted to WDM (wavelength-division multiplexing).

The first terminal 18' has N service optical senders 30A (#1 to #N) and N backup optical senders 30B (#1 to #N), so as to perform WDM of N channels (N is an integer larger than 1). The optical senders 30A (#1) and 30B (#1) to 30A (#N) and 30B (#N) output optical signals having different wavelengths $\lambda_1$ to $\lambda_N$, respectively. These optical signals are wavelength-division multiplexed in an optical multiplexer (MUX) 74, and WDM optical signals are sent from the optical multiplexer 74 to the up line 26.

The second terminal 20' has an optical demultiplexer (DMUX) 76 for dividing the received WDM optical signals into optical signals having wavelengths $\lambda_1$ to $\lambda_N$. The optical signals having the wavelengths $\lambda_1$ to $\lambda_N$ are supplied to optical receivers 34A (#1) or 34B (#1) to 34A (#N) or 34B (#N), respectively.

Similarly, the down line 28 is provided with optical senders 36A (#1) and 36B (#1) to 36A (#N) and 36B (#N), an optical multiplexer 78, an optical demultiplexer 80, and optical receivers 40A (#1) and 40B (#1) to 40A (#N) and 40B (#N).

Also in an optical communication system to which WDM is applied as mentioned above, the present invention can be embodied closedly in the first terminal 18' or the second terminal 20' or openly over the terminals 18' and 20'. For example, in the case of embodying the present invention openly over the terminals 18' and 20' in the system shown in FIG. 10, each of the optical senders 30A (#1 to #N) is configured as similar to the optical sender 30A shown in FIG. 4, and each of the optical receivers 34A (#1 to #N) is configured as similar to the optical receiver 34A shown in FIG. 4. The control unit 10 shown in FIG. 4 controls the wavelength of each of the optical signals from the optical senders 30A (#1 to #N) shown in FIG. 10 so that the error count to be detected in each of the optical receivers 34A (#1 to #N) decreases. In the case that the control unit 10 has such a configuration as shown in FIG. 6, for example, the modification of operation of the above-mentioned control unit 10 as adapted to WDM can be easily handled by the modification of a program. Further, the down line 28 may be used for transmission of the error count detected in each of the optical receivers 34A (#1 to #N).

Figure 11A:
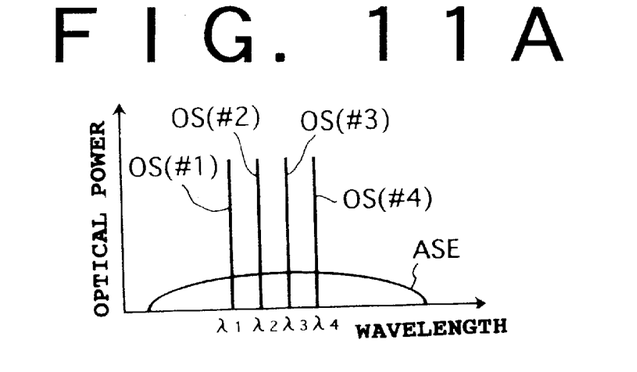
FIGS. 11A, 11B, and 11C are illustrations of spectra in the case that the present invention is applied to WDM (wavelength-division multiplexing)
Figure 11B:
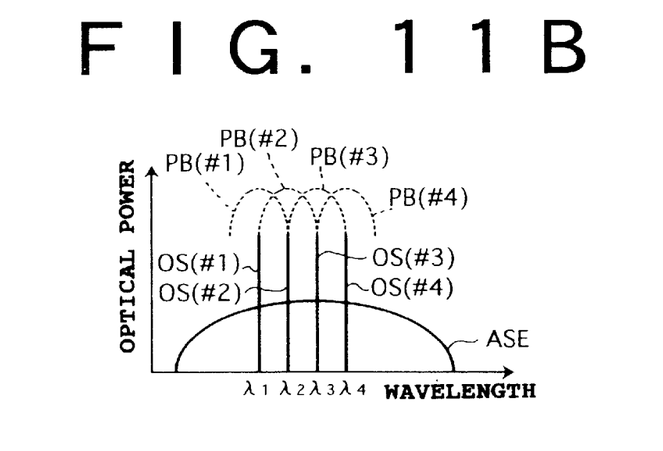
Figure 11C:
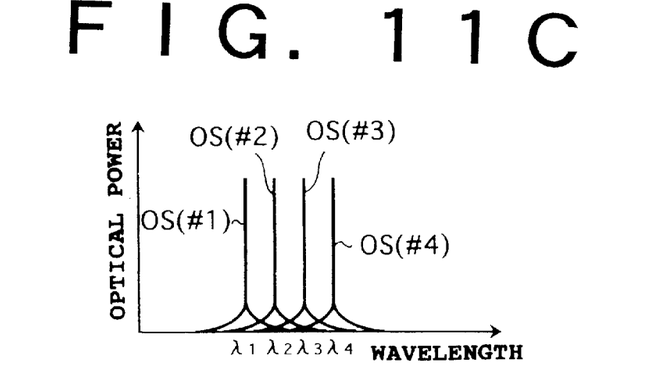

There will now be described spectra in the case that the present invention is applied to WDM as mentioned above, with reference to FIGS. 11A, 11B, and 11C. In this case, it is assumed that the number of channels, N, of WDM is 4. FIGS. 11A, 11B, and 11C respectively correspond to FIGS. 5A, 5B, and 5C. Reference symbol OS (#1 to #4) represents the spectrum of an optical signal in each channel; reference symbol ASE represents an ASE spectrum; and reference symbol PB (#1 to #4) represents the pass band of the optical band-pass filter 4 included in each of the optical receivers 34A (#1 to #N). As mentioned above, the wavelengths of optical signals output from the E/O converters 2 included in the optical senders 30A (#1 to #N) are individually controlled. Accordingly, the spectrum of the optical signal in each channel is stabilized so as to coincide with the center wavelength in each pass band as shown in FIGS. 11B and 11C.

Figure 12:
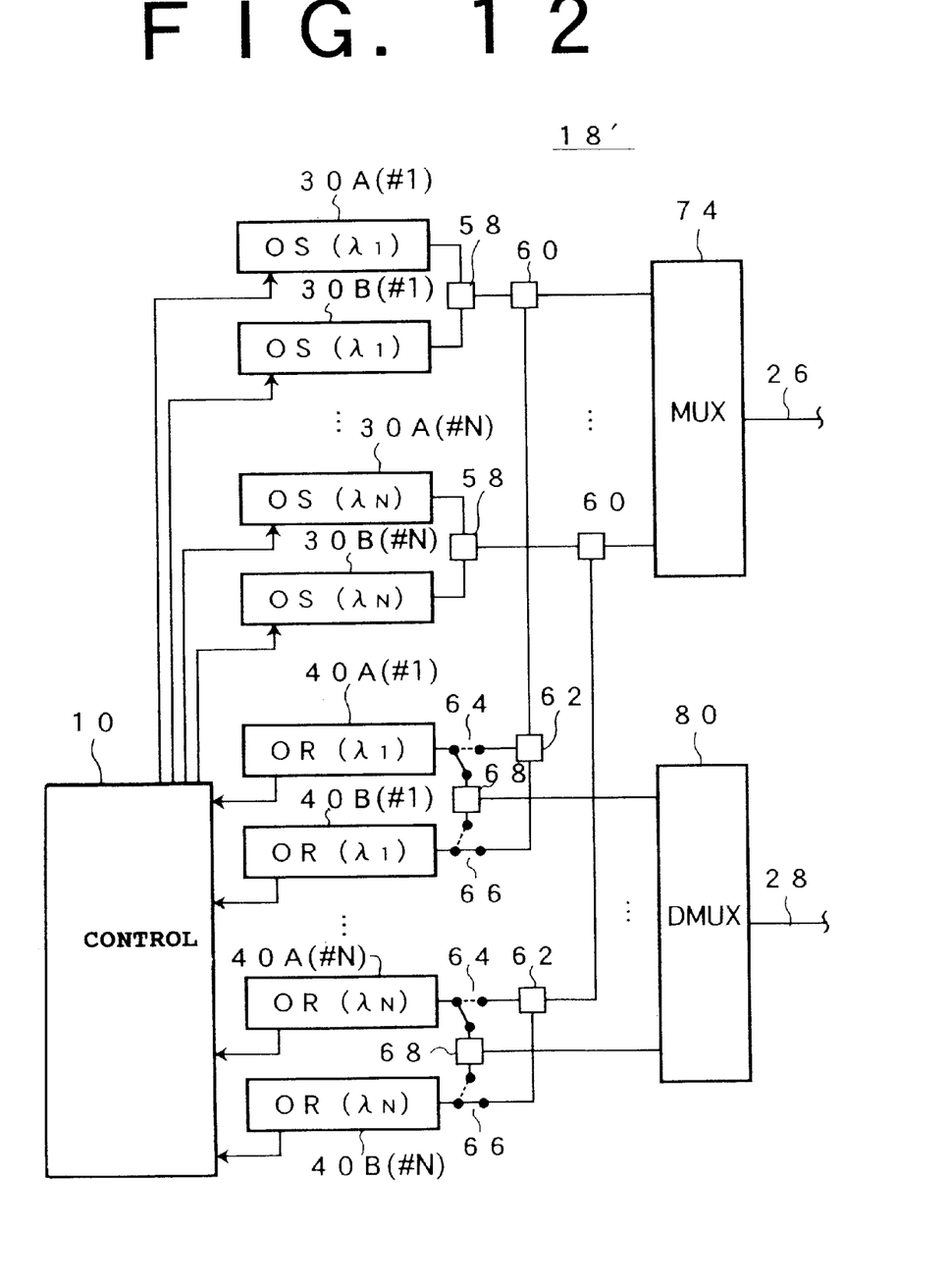
FIG. 12 is a block diagram of a system showing a third preferred embodiment of the present invention.

Referring to FIG. 12, there is shown a third preferred embodiment of the present invention. In FIG. 12, there is shown a terminal device in the case that the present invention is applied to the first terminal 18' shown in FIG. 10. The configuration and operation of this terminal device will be easily understood by referring to FIGS. 9 and 10. In FIG. 9, one for each of the optical couplers 58, 60, 62, and 68 and the optical switches 64 and 66 is used, while in the preferred embodiment shown in FIG. 12, each of these optical couplers and these optical switches is provided in a number corresponding to the number N of channels of WDM. According to this preferred embodiment, the wavelength of an optical signal in each channel is controlled so that an error count in each channel decreases. Accordingly, it is possible to prevent a degradation in transmission quality due to wavelength changes in all the channels of WDM.

As described above, according to the method, device, or system for controlling the wavelength of an optical signal according to the present invention, it is possible to prevent a degradation in transmission quality due to wavelength changes of an optical signal.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A system for controlling a wavelength of an optical signal, comprising:

an E/O converter for converting an input electrical signal into an optical signal, said E/O converter including a laser diode;

an optical band-pass filter for being supplied with said optical signal;

an O/E converter to which said optical signal passed through said optical band-pass filter is supplied, for converting said optical signal into an output electrical signal;

a bit error detector for detecting a bit error of said output electrical signal; and a controller for controlling a parameter determining a wavelength of said optical signal output from said E/O converter so as to decrease said bit error detected, said parameter being a temperature of said laser diode.

2. A system according to claim 1, wherein said optical band-pass filter has a pass band including a center wavelength substantially providing a maximum transmittance, whereby the wavelength of said optical signal substantially coincides with said center wavelength.

3. A system according to claim 1, further comprising an optical amplifier for amplifying said optical signal.

4. A system for controlling a wavelength of an optical signal, comprising:

an E/O converter for converting an input electrical signal into an optical signal;

an optical band-pass filter for being supplied with said optical signal;

an O/E converter to which said optical signal passed through said optical band-pass filter is supplied, for converting said optical signal into an output electrical signal;

a bit error detector for detecting a bit error of said output electrical signal;

a controller for controlling a parameter determining a wavelength of said optical signal output from said E/O converter so as to decrease said bit error detected;

an encoder for adding a redundancy code to a transmission data code of said input electrical signal; and a decoder for correcting said bit error of said output electrical signal according to said redundancy code;

said bit error detector including means for counting corrections of said bit error of said output electrical signal.

5. A system for controlling a wavelength of an optical signal, comprising:

an E/O converter for converting an input electrical signal into an optical signal;

an optical band-pass filter for being supplied with said optical signal;

an O/E converter to which said optical signal passed through said optical band-pass filter is supplied, for converting said optical signal into an output electrical signal;

a bit error detector for detecting a bit error of said output electrical signal; and a controller for controlling a parameter determining a wavelength of said optical signal output from said E/O converter so as to decrease said bit error detected, said E/O converter, said optical band-pass filter, said O/E converter, and said bit error detector respectively comprising a plurality of E/O converters, a plurality of optical band-pass filters, a plurality of O/E converters, and a plurality of bit error detectors for wavelength-division multiplexing;

said controller controlling said parameter for each of said plurality of E/O converters.

6. A system for controlling a wavelength of an optical signal, comprising:

an E/O converter for converting an input electrical signal into an optical signal;

an optical band-pass filter for being supplied with said optical signal;

an O/E converter to which said optical signal passed through said optical band-pass filter is supplied, for converting said optical signal into an output electrical signal;

a bit error detector for detecting a bit error of said output electrical signal; and a controller for controlling a parameter determining a wavelength of said optical signal output from said E/O converter so as to decrease said bit error detected, said controller including means for changing the wavelength of said optical signal by a minute amount, and means for determining whether said detected bit error has increased or decreased across a change in the wavelength of said optical signal, said parameter being changed according to a result of determination by said determining means.

7. A terminal device for controlling a wavelength of an optical signal, comprising:

an optical sender including an E/O converter for converting an input signal into a first optical signal;

a divider for dividing said first optical signal into a first beam to be sent to a first optical transmission line and a second beam for monitoring;

first and second optical receivers; and an optical circuit for selectively supplying a second optical signal from a second optical transmission line and said second beam to said first and second optical receivers, respectively;

each of said first and second optical receivers comprising:
an optical band-pass filter for being supplied with said second beam;
an O/E converter to which said second beam passed through said optical band-pass filter is supplied, for converting said second beam into an output electrical signal; and
a bit error detector for detecting a bit error of said output electrical signal;

said terminal device further comprising a controller for controlling a parameter determining a wavelength of said first optical signal output from said E/O converter so as to decrease said bit error detected.

8. A terminal device according to claim 7, further comprising:

a second optical sender provided as a backup of said optical sender; and means for operatively connecting said second optical sender to said first optical transmission line and said optical circuit.

9. A terminal device according to claim 7, wherein said optical band-pass filter has a pass band including a center wavelength substantially providing a maximum transmittance, whereby the wavelength of said first optical signal substantially coincides with said center wavelength.

10. A terminal device according to claim 7, wherein said E/O converter comprises a laser diode.

11. A terminal device according to claim 10, wherein said parameter is a temperature of said laser diode.

12. A terminal device according to claim 7, wherein:

said optical sender further comprises an encoder for adding a redundancy code to a transmission data code of said input signal;

each of said first and second optical receivers further comprises a decoder for correcting a bit error of said output electrical signal according to said redundancy code; and said bit error detector includes means for counting corrections of said bit error of said output electrical signal.

13. A terminal device according to claim 7, wherein:

said optical sender, said first optical receiver, and said second optical receiver respectively comprise a plurality of optical senders, a plurality of first optical receivers, and a plurality of second optical receivers for wavelength-division multiplexing; and said controller controls said parameter for each of said plurality of optical senders.

14. A terminal device according to claim 7, wherein said controller includes means for changing the wavelength of said first optical signal by a minute amount, and means for determining whether said detected bit error has increased or decreased across a change in the wavelength of said first optical signal;

said parameter being changed according to a result of determination by said determining means.

15. A terminal device according to claim 7, wherein said optical sender further comprises an optical amplifier for amplifying said first optical signal.

16. A terminal device according to claim 7, wherein each of said first and second optical receivers further comprises an optical amplifier operatively connected to said O/E converter.

17. A method for controlling a wavelength of an optical signal, comprising the steps of:

(a) converting an input electrical signal into an optical signal using a laser diode;

(b) supplying said optical signal to an optical band-pass filter;

(c) converting said optical signal passed through said optical band-pass filter into an output electrical signal;

(d) detecting a bit error of said output electrical signal; and (e) controlling the temperature of said laser diode so that said bit error detected decreases.

18. A method according to claim 17, wherein said optical band-pass filter has a pass band including a center wavelength substantially providing a maximum transmittance, whereby the wavelength of said optical signal substantially coincides with said center wavelength.

19. A system for controlling a wavelength of an optical signal, comprising:

an E/O converter to convert an input electrical signal into an optical signal having a predetermined wavelength, said E/O converter including a laser diode;

a monitoring unit to receive the optical signal and produce an output corresponding to a shift in the wavelength of the optical signal from the predetermined wavelength; and a control device to receive the output from the monitoring unit, adjust the temperature of the laser diode and stabilize the wavelength of the optical signal at the predetermined wavelength, the E/O converter, monitoring unit and control device all being provided in a first terminal station, the first terminal station having main and auxiliary E/O converters and main and auxiliary O/E converters, the monitoring unit being provided in the auxiliary O/E converter for monitoring the optical signal of the main E/O converter.

20. A system for controlling a wavelength of an optical signal, comprising:

an E/O converter to convert an input electrical signal into an optical signal, said E/O converter including a laser diode;

an error correction device to correct errors in the optical signal received from the E/O converter and count the number of errors requiring correction; and a control device operatively connected to the error correction device to adjust the temperature of the laser diode to thereby minimize the number of errors requiring correction wherein the E/O converter produces a predetermined wavelength optical signal, the control device stabilizing the wavelength of the optical signal produced by the E/O converter at the predetermined wavelength such that if an original optical signal has errors requiring correction, the wavelength is incrementally increased and decreased and the number of errors of the increased and deceased wavelength optical signal are compared with the number of errors of the original optical signal to stabilize the optical signal.

21. A system according to claim 20, wherein the temperature of the laser diode is increased to increase the wavelength of the optical signal and the temperature of the laser diode is decreased to decrease the wavelength of the optical signal.

* * * * *